United States Patent
Kazmi et al.

(10) Patent No.: US 8,711,766 B2
(45) Date of Patent: Apr. 29, 2014

(54) SRB ENHANCEMENT ON HS-DSCH DURING CELL CHANGE

(75) Inventors: Muhammad Ali Kazmi, Bromma (SE); Henrik Enbuske, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 675 days.

(21) Appl. No.: 11/996,343

(22) PCT Filed: Jul. 10, 2006

(86) PCT No.: PCT/SE2006/050252
§ 371 (c)(1),
(2), (4) Date: Jan. 21, 2008

(87) PCT Pub. No.: WO2007/011301
PCT Pub. Date: Jan. 25, 2007

(65) Prior Publication Data
US 2008/0212528 A1 Sep. 4, 2008

(30) Foreign Application Priority Data
Jul. 21, 2005 (SE) ...................................... 0501728

(51) Int. Cl.
*H04W 4/00* (2009.01)
(52) U.S. Cl.
USPC ........................... 370/328; 370/329; 370/332
(58) Field of Classification Search
USPC ....................................................... 370/328
See application file for complete search history.

(56) References Cited

U.S. PATENT DOCUMENTS

| | | | | |
|---|---|---|---|---|
| 6,751,227 | B1 * | 6/2004 | Ahmavaara et al. | 370/410 |
| 7,130,638 | B2 * | 10/2006 | Chen et al. | 455/452.2 |
| 7,822,044 | B2 * | 10/2010 | Lee et al. | 370/400 |
| 2002/0114305 | A1 | 8/2002 | Oyama et al. | |
| 2004/0009767 | A1 * | 1/2004 | Lee et al. | 455/422.1 |
| 2004/0224698 | A1 | 11/2004 | Yi et al. | |
| 2005/0281222 | A1 * | 12/2005 | Ranta-Aho et al. | 370/328 |
| 2006/0052103 | A1 * | 3/2006 | Mikoshiba et al. | 455/435.3 |

(Continued)

FOREIGN PATENT DOCUMENTS

| | | |
|---|---|---|
| KR | 2004001726 | 7/2005 |
| WO | WO 01/30103 A1 | 4/2001 |

(Continued)

OTHER PUBLICATIONS

3GPP, 3rd Generation Partnership Project; Technical Specification Group Radio Access Network; Physical Layer Aspects of UTRA High Speed Downlink Packet Access (Release 4), 3GPP TR 25.848 V4.0.0 (Mar. 2001).

(Continued)

*Primary Examiner* — Guang Li

(57) ABSTRACT

The present invention relates to a radio network controller and a radio base station for prioritization of signalling radio bearers (SRB) with regard to their content to achieve an efficient resource usage. The radio network controller can retrieve knowledge about the resource status in a Node B serving a certain user equipment and request this Node B to prioritize signalling radio bearers (SRB) carrying signalling information with regard to radio resource control that is of particular importance and intended to be efficiently forwarded to said user equipment. The Node B then prioritizes such signalling radio bearers and schedules the prioritized signalling radio bearers with respect to their priorities using sufficient radio resources.

26 Claims, 1 Drawing Sheet

(56) References Cited

U.S. PATENT DOCUMENTS

| | | | |
|---|---|---|---|
| 2006/0062193 A1* | 3/2006 | Choi et al. .................... | 370/342 |
| 2007/0121542 A1* | 5/2007 | Lohr et al. .................... | 370/329 |
| 2008/0045272 A1* | 2/2008 | Wang et al. .................. | 455/561 |
| 2010/0008307 A1* | 1/2010 | Torsner et al. ............... | 370/329 |

FOREIGN PATENT DOCUMENTS

| | | | |
|---|---|---|---|
| WO | WO 01/33885 A1 | 5/2001 | |
| WO | WO 02/067605 A1 | 8/2002 | |
| WO | WO 02/091763 A1 | 11/2002 | |
| WO | WO 2005/029785 A1 | 3/2005 | |

OTHER PUBLICATIONS

3GPP, $3^{rd}$ Generation Partnership Project; Technical Specification Group Radio Access Network; Radio Resource Control (RRC); Protocol Specification (Release 6), 3GPP TS 25.331 V6.6.0 (Jun. 2005).

RAN2. LS on Signalling Radio Bearers Mapping on HS-DSCH. 3GPP Draft; R2-042271; $3^{rd}$ Generation Partnership Project. Oct. 8, 2004.

$3^{rd}$ Generation Partnership Project; Technical Specification Group Radio Access Network; Physical Channels and mapping of transport channels onto physical channels (FDD) (Release 5). 3GPP TS 25.211 v5.7.0 (Jun. 2005).

$3^{rd}$ Generation Partnership Project; Technical Specification Group Radio Access Network; Physical layer procedures (FDD) (Release 6). 3GPP TS 25.214 v6.6. (Jun. 2005).

Nokia: "Enhancements for Fractional DPCH and mapping of SRBs on HS-DSCH". 3GPP TSG-RAN WG2 #45bis. R2-050114. Jan. 10-15, 2005. Sophia-Antipolis France.

\* cited by examiner

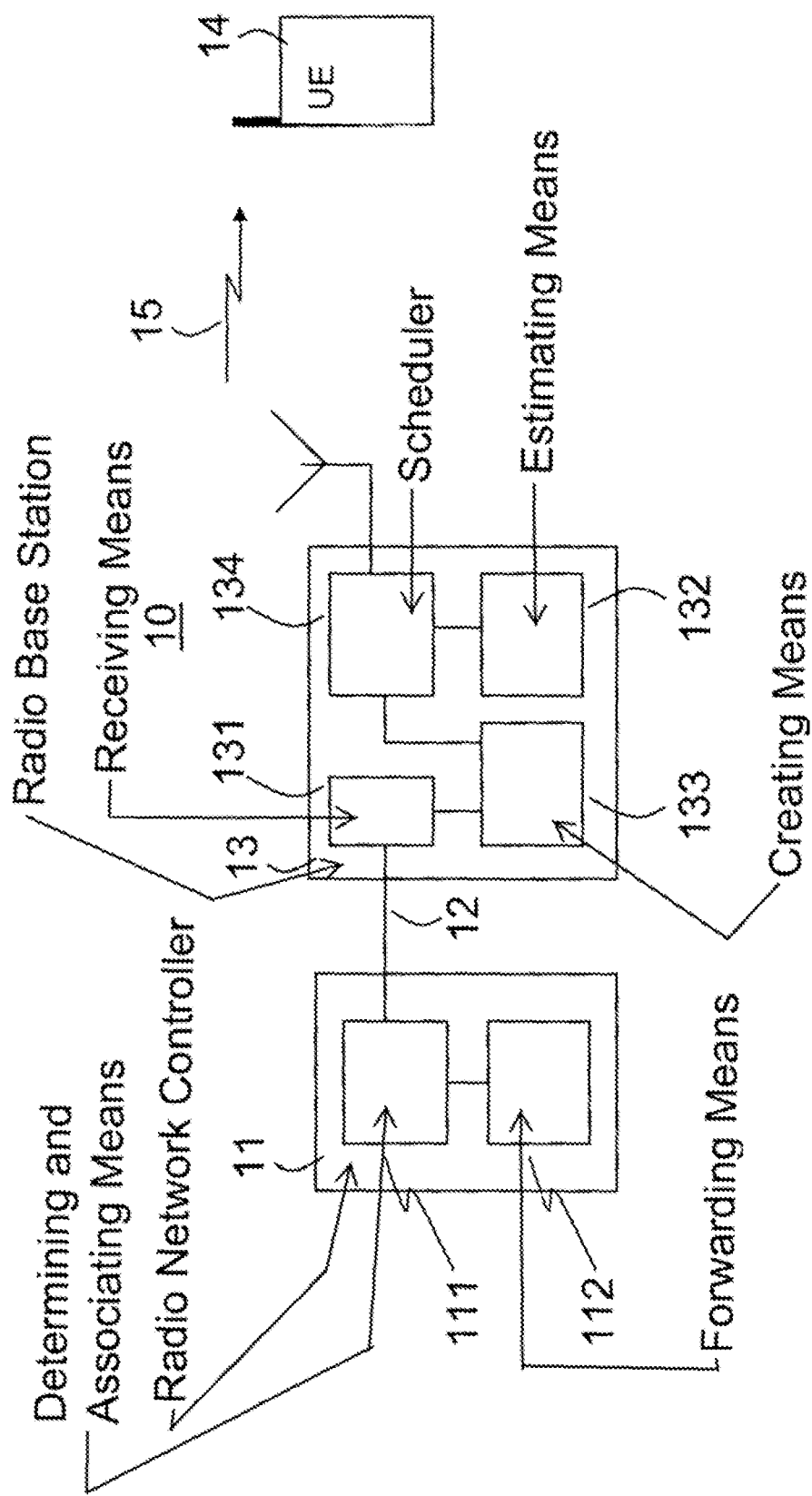

SRB ENHANCEMENT ON HS-DSCH DURING CELL CHANGE

FIELD OF THE INVENTION

The present invention relates to methods and arrangements in a $3^{rd}$ generation telecommunication system including High-Speed Downlink Packet Access (HSDPA), in particular to achieve an improved handling of user equipments applying the High-Speed Downlink Shared Channel (HS-DSCH) by means of an improved transmission of vital Signalling Radio Bearers (SRB).

BACKGROUND OF THE INVENTION

In a $3^{rd}$ generation telecommunication system including the feature of High-Speed Downlink Packet Access (HS-DPA), e.g. as described in the document 3GPP TR 25.848: "Physical Layer Aspects of UTRA High Speed Downlink Packet Access" issued by the $3^{rd}$ Generation partnership Project (3GPP), every user equipment (UE) is allocated a dedicated channel (DPCH) in both directions to exchange higher layer signalling information between, e.g., user equipment and Radio Network Controller (RNC). Especially at high load, with a large number of HSDPA users in a cell, it will be required to allocate a large number of OVSF codes in the downlink. OVSF codes are Orthogonal Variable Spreading Factor codes. Therefore, in order to efficiently use the resources and save downlink OVSF codes the concept of a Fractional Dedicated Physical Channel (F-DPCH) has been introduced in Release 6 of the 3GPP specifications for $3^{rd}$ generation telecommunication systems. The F-DPCH carries only TPC commands of several HSDPA users. This means the dedicated channels (TPC) of several user equipments are time multiplexed on one OVSF code in order to run power control. The corresponding signalling radio bearers (SRB) carrying the radio resource control (RRC) related information when using F-DPCH, said information relating, e.g., to cell change, active set update, RB reconfiguration, etc., are mapped on the HS-DSCH which thus leads to an efficient usage of the downlink channelization codes.

When F-DPCH is used, the signalling radio bearers are sent to the user equipment on the High-Speed Downlink Shared Channel (HS-DSCH). However, this channel does not support soft handover (SHO). This can in some cases lead to the situation that the signalling radio bearer can be lost due to poor HS-DSCH reception quality at the user equipment. The uplink quality, e.g. for the UL SRB:s, on the other hand can still be sufficient since both DCH and E-DCH can gain from the benefits of the soft handover operation. As apparent, e.g., from the document 3GPP TS25.331: "Radio Resource Control Protocol Specification (FDD)", the signalling radio bearers (SRB) can carry vital radio resource management (RRM) related information such as, e.g., active set update, cell change, radio bearer reconfiguration, etc. This means that the loss of a downlink signalling radio bearer (SRB) can lead to unnecessary SRB retransmissions, call drops and increased delay in scheduling the user in the new HS-DSCH serving cell.

There are two previous solutions known to solve this problem:

According to a first prior-art solution, it is the user equipment that detects that the HS-DSCH reception quality is under a certain threshold value and performs autonomously a cell update. However, this solution implies the disadvantage that the user equipment does not know the best cell in terms of available radio resources. The user equipment may thus encounter the same problem in the new cell. As there are no possibilities for any kind of load control, this solution may even turn the problem to the worse. The Serving RNC (SRNC) also needs to do the pre-configuration of the user equipment for all the cells in the active set. Furthermore, re-routing of the data by the SRNC from the old serving cell to the new serving cell cannot be done until the user equipment has successfully informed the SRNC in order to switch to the new cell.

According to another prior-art solution it is the Node B that detects that a signalling radio bearer is not successfully transmitted to the user equipment and informs the SRNC to take appropriate measures. However, it may not be easy for the Node B to detect whether the signalling radio bearer has been lost or not. Further, the Node B is not aware of what type of information is carried by the signalling radio bearer, which implies that the Node B will indicate to the SRNC each time an SRB is lost and, consequently, would unnecessarily increase the Iub-signalling load. Finally, this proposed solution may involve long delays during which the call can be lost.

BRIEF DESCRIPTION OF THE DRAWINGS

FIG. 1 illustrates a part of a radio access network, in particular the transmission of a priority indicator for a certain SRB from the Serving RNC (SRNC) to the Node B.

SUMMARY OF THE INVENTION

In solutions according to the state of the art, the signalling radio bearers (SRB) as a message type in itself can be prioritised; however, as described above, such a prioritisation may still imply disadvantages with respect to inefficient resource usage, increased signalling load, and longer delay times for the communication to user equipments aiming, e.g., to initiate a cell change.

It is therefore an object of the present invention to achieve an improved prioritisation of the signalling radio bearers (SRB) avoiding the disadvantages stated above.

It is the basic idea of the present invention that signalling radio bearers (SRB) can be prioritised with regard to their content. This implies that different priority levels are assigned to the signalling radio bearers, whereby said priority levels correspond to the perceived degree of importance of the signalling radio bearer. In the solution according to the present invention the SRNC can retrieve knowledge about the resource status in a Node B serving a certain user equipment and request this Node B to make a content-based prioritisation of signalling radio bearers (SRB) carrying cell change information or any other signalling information with regard to radio resource control that is considered to be of particular importance and, thus, desired to be efficiently forwarded to said user equipment. The Node B then prioritises such signalling radio bearers and schedules the prioritized signalling radio bearers with respect to their priorities using sufficient radio resources, e.g. the transmission power, in order to ensure the correct reception of the signalling message at the user equipment.

According to a conceivable embodiment of the present invention, the SRNC sends to the Node B a priority boosting indicator message for a signalling radio bearer (SRB) that is multiplexed on the HS-DSCH channel and bears important signalling information.

It is an advantage of the present invention that the HS-DSCH serving cell can be changed without unnecessary SRB and RLC retransmissions.

It is a further advantage of the present invention that the call drop rate is minimized.

It is yet another advantage of the present invention that the time to schedule a user equipment in a new serving cell can be reduced.

It is still another advantage of the present invention that the radio network can reduce the overall control plane procedure time.

Other objects, advantages and novel features of the invention will become apparent from the following detailed description of the invention when considered in conjunction with the accompanying drawings and claims.

DETAILED DESCRIPTION

The following RNC-based solutions describe embodiments that can be proposed in order to ensure that a user equipment successfully receives a signalling radio bearer (SRB) marked, e.g., with the following types of important information:

Priority Boosting Indication

Resource Generation during Retransmissions

The first embodiment relates to a priority boosting indication. As shown in FIG. 1, when a SRNC 11 sends a signalling radio bearer (SRB) to the user equipment 14 through HS-DSCH 15, it also sends a priority boosting indication for the same signalling radio bearer (SRB) to the Node B 13 on the Iub interface 12. It is up to the SRNC 11 to decide which signalling radio bearer (SRB) should be associated with such a priority boosting and, potentially, the associated priority level. An example of a prioritized SRB may contain information, e.g., about an HS-DSCH serving cell change in order to prevent call dropping. There are several conceivable alternatives for the SRNC 11 to send the priority-boosting indicator to the Node B 13: This can be done either together with the initial SRB transmission, only together with SRB retransmissions, or with all SRB transmissions (i.e. initial transmission and retransmissions). As a result the scheduler 134 in the Node B 13 prioritizes the signalling radio bearer (SRB) that is associated with the priority boosting over all other logical channels, e.g. the Dedicated Traffic Channels (DTCH) or other signalling radio bearers, by assigning sufficient radio resource to ensure its correct delivery.

In case there is more than one user equipment that needs to receive important SRB information, the SRNC 11 can either set different priorities among these user equipments or assign the same priorities among them. The SRB priority indicator can comprise just a one-bit flag or it can consist of multiple-priority level indicator for different types of signalling radio bearer. For instance, in case of a multiple-priority level indicator the SRNC can assign higher priority levels to user equipments applying time-critical services, e.g. VoIP, than to user equipments that apply less time-critical services, e.g. packet data. In addition, or alternatively, the multiple priority levels can also be used to prioritize between different SRB messages for the same type of service. For instance, RRC messages associated with the cell change can be prioritized over other messages.

Another embodiment, which can be used in combination or alternatively to the first embodiment, relates to resource generation during retransmissions. According to this embodiment a radio network controller 11 can detect a lack of downlink resources by detecting the loss of a signalling radio bearer (SRB) to a user equipment 14, e.g. by determining a timeout or by detecting a retransmission request. If such losses occur too often, i.e. the number of losses is beyond a certain threshold value, the radio network controller 11 can then perform any of the actions described below in order to create/free radio resources that can be used by the base station scheduler 134 to achieve a more reliable transmission of signalling radio bearers:

1) The SRNC can reduce the rate of some of the radio links, e.g. by means of a channel down switching, to increase the non-HSDPA radio resource, e.g. the transmission power. The SRNC then re-transmits the downlink signalling radio bearer (DL SRB). This method is beneficial if there are many user equipments that are unable to receive their signalling radio bearers.

2) The RNC performs a TFC restriction on other channels, e.g. the DCH, in order to relieve power for HS-DSCH and then re-transmits the signalling radio bearer (SRB).

The SRNC can detect the loss of SRB transmission due to RLC time out or by any other mechanism.

In one aspect, there is a radio network controller 11 in a telecommunication system 10 providing a connection 12 to at least one radio base station 13. The radio network controller 11 is characterized by: means 111 for determining and associating a priority indicator with respect to the content of a signalling radio bearer of said radio base station 13; and means 112 for forwarding the signalling radio bearer with the associated priority indicator to the radio base station 13.

In another aspect, there is a radio base station 13 in a telecommunication system 10, where the radio base station 13 providing a connection 12 to a radio network controller 11 and providing communication services to one or more user equipments 14. The radio base station 13 is characterized by: means 131 for receiving a request from a serving radio network controller 11 to transmit a signalling radio bearer to a user equipment 14 and associating said signalling radio bearer with a priority indicator that has been determined with respect to the content of the signalling radio bearer; means 132 for estimating the available radio resources for downlink transmissions on a high-speed downlink shared channel 15 to the user equipments 14; means 133 for creating the signalling radio bearer being associated with said priority indicator; and scheduler 134 for scheduling of resources for transmission of the signalling radio bearer with respect to its priority over channels with lower priority such as to assign sufficient radio resources that ensure correct delivery of the signalling radio bearer.

The invention claimed is:

1. A method in a radio network controller of a telecommunication system, said radio network controller providing a connection to a radio base station which provides communication services to a user equipment, comprising the steps of:

determining, at the radio network controller, a priority indicator with respect to a content of a signalling radio bearer to be sent on a High-Speed Downlink Shared Channel (HS-DSCH) from the radio base station to the user equipment;

associating, at the radio network controller, said priority indicator to the signalling radio bearer;

transmitting, from the radio network controller, to the radio base station the priority indicator associated with said signalling radio bearer; and detecting, by the radio network controller, a lack of downlink radio resources and then increasing a reliability of transmitting the signalling radio bearer to the user equipment by increasing an availability of radio resources which is done by performing at least one of following steps:

reconfiguring a channel of one or several radio links; and restricting a transport format of one or several radio links; and wherein the detecting step further comprises determining, prior to determining the priority indicator, a number of losses of signalling radio bearers and if said number exceeds a threshold value then increasing the availability of radio resources by performing at least one of the reconfiguring step and the restricting step and then repeating said step of determining a number of losses of signalling radio bearers after having increased the availability of radio resources.

2. The method according to claim 1, wherein the priority indicator is transmitted with the initial transmission of the signalling radio bearer.

3. The method according to claim 1, wherein the priority indicator is transmitted with a retransmission of the signalling radio bearer.

4. The method according to claim 1, wherein the priority indicator consists of a one-bit flag.

5. The method according to claim 1, wherein the priority indicator consists of a multiple-priority level field.

6. The method according to claim 5, wherein different priority levels are assigned for signalling radio bearers to users using the same service.

7. The method according to claim 5, wherein different priority levels are assigned with regard to the service that the signalling radio bearer refers to.

8. The method according to claim 5, wherein different priority levels are assigned with regard to the events that the signalling radio bearer shall transmit.

9. The method according to claim 1, wherein the content relates to radio resource control information.

10. The method according to claim 1, wherein the content relates to cell change information.

11. The method according to claim 1, wherein the radio base station has a previously established radio link with the user equipment.

12. The method according to claim 1, wherein said step of determining a number of losses of signalling radio bearers further comprises detecting a Radio Link Control (RLC) timeout.

13. The method according to claim 1, wherein said step of determining a number of losses of signalling radio bearers further comprises detecting a retransmission request.

14. The method according to claim 1, wherein the reconfiguring step further comprises performing a channel down switching step to increase non-High-Speed Downlink Packet Access (HSDPA) resources.

15. The method according to claim 1, wherein the restricting step further comprises performing a Transport Format Combination (TFC) restriction on several Dedicated Channels (DCHs) to relieve power for the HS-DSCH.

16. A radio network controller in a telecommunication system providing a connection to a radio base station which provides communication services to a user equipment, comprising:
means, within the radio network controller, for determining and associating a priority indicator with respect to a content of a signalling radio bearer to be sent on a High-Speed Downlink Shared Channel (HS-DSCH) from the radio base station to the user equipment;
means, within the radio network controller, for forwarding the signalling radio bearer with the associated priority indicator to the radio base station; and
means, within the radio network controller, for detecting a lack of downlink radio resources and then increasing a reliability of transmitting the signalling radio bearer to the user equipment by increasing an availability of radio resources which is done by utilizing at least one of following:
means for reconfiguring a channel of one or several radio links; and
means for restricting a transport format of one or several radio links; and
wherein the detecting means further comprises means for determining, prior to determining the priority indicator, a number of losses of signalling radio bearers and if said number exceeds a threshold value then increasing the availability of radio resources by utilizing at least one of the reconfiguring means and the restricting means and then repeating said determining a number of losses of signalling radio bearers after having increased the availability of radio resources.

17. The radio network controller according to claim 16, wherein the content relates to radio resource control information.

18. The radio network controller according to claim 16, wherein the content relates to cell change information.

19. The radio network controller according to claim 16, wherein the radio base station has a previously established radio link with the user equipment.

20. A telecommunication system comprising:
a radio network controller that retrieves knowledge about a resource status in a radio base station serving a certain user equipment and requests the radio base station to make a content-based prioritization of a signalling radio bearer carrying radio resource control information by;
determining a priority indicator with respect to the radio resource control information of the signalling radio bearer to be sent on a High-Speed Downlink Shared Channel (HS-DSCH) from the radio base station to the user equipment;
associating said priority indicator to the signalling radio bearer;
transmitting to the radio base station the priority indicator associated with said signalling radio bearer; and
the radio base station prioritizes the signalling radio bearer and schedules the signalling radio bearer based on the priority indicator using sufficient downlink radio resources to ensure correct reception of the signalling radio bearer on the HS-DSCH to the user equipment; and
the radio network controller is configured to detect a lack of downlink radio resources and then increase a reliability of transmitting the signalling radio bearer to the user equipment by increasing an availability of radio resources which is done by performing at least one of following:
reconfiguring a channel of one or several radio links; and
restricting a transport format of one or several radio links; and
wherein the radio network controller is configured to determine, prior to determining the priority indicator, a number of losses of signalling radio bearers and if said number exceeds a threshold value then increasing the availability of radio resources by performing at least one of the reconfiguring operation and the restricting operation and then repeating said operation of determining a number of losses of signalling radio bearers after having increased the availability of radio resources.

21. A method for improving prioritization of signalling radio bearers comprising steps of:

retrieving, at a radio network controller, knowledge about a resource status in a radio base station serving a certain user equipment;

requesting, by the radio network controller, the radio base station to make a content-based prioritization of a signalling radio bearer carrying radio resource control information by:

determining a priority indicator with respect to the radio resource control information of the signalling radio bearer to be sent on a High-Speed Downlink Shared Channel (HS-DSCH) from the radio base station to the user equipment;

associating said priority indicator to the signalling radio bearer;

transmitting to the radio base station the priority indicator associated with said signalling radio bearer; and prioritizing, at the radio base station, the signalling radio bearer;

scheduling, at the radio base station, the using sufficient downlink radio resources to ensure correct reception of the signalling radio bearer on the HS-DSCH to the user equipment; and detecting, by the radio network controller, a lack of downlink radio resources and then increasing a reliability of transmitting the signalling radio bearer to the user equipment by increasing an availability of radio resources which is done by performing at least one of following steps:

reconfiguring a channel of one or several radio links; and restricting a transport format of one or several radio links; and wherein the radio network controller is configured to determine, prior to determining the priority indicator, a number of losses of signalling radio bearers and if said number exceeds a threshold value then increasing the availability of radio resources by performing at least one of the reconfiguring step and the restricting step and then repeating said step of determining a number of losses of signalling radio bearers after having increased the availability of radio resources.

22. A method for improving prioritization of signalling radio bearers in a telecommunication system, the telecommunication system comprising a radio network controller which provides a connection to a radio base station which provides communication services to a user equipment, the method comprising the steps of:

determining, at the radio network controller, a priority indicator with respect to a content of a signalling radio bearer;

associating, at the radio network controller, said priority indicator to the signalling radio bearer; and, transmitting from the radio network controller to the radio base station the priority indicator associated with said signalling radio bearer;

receiving, at the radio base station, a request from the radio network controller to transmit the signalling radio bearer to the user equipment, the signalling radio bearer being associated with the priority indicator that has been determined with respect to a content of said signalling radio bearer;

estimating, at the radio base station, the available radio resources for downlink transmissions on a high-speed downlink shared channel to the user equipment;

scheduling, at the radio base station, of downlink radio resources for the signalling radio bearer;

assigning, at the radio base station, sufficient downlink radio resources to ensure a correct delivery of the signalling radio bearer over the high-speed downlink shared channel; and detecting, at the radio network controller, a lack of downlink radio resources and then increasing a reliability of transmitting the signalling radio bearer to the user equipment by increasing an availability of radio resources which is done by performing at least one of following steps:

reconfiguring a channel of one or several radio links; and restricting a transport format of one or several radio links; and wherein the detecting step further comprises determining, prior to determining the priority indicator, a number of losses of signalling radio bearers and if said number exceeds a threshold value then increasing the availability of radio resources by performing at least one of the reconfiguring step and the restricting step and then repeating said step of determining a number of losses of signalling radio bearers after having increased the availability of radio resources.

23. A telecommunication system comprising:

a radio network controller providing a connection to a radio base station, the radio network controller comprising:

means, within the radio network controller, for determining and associating a priority indicator with respect to a content of a signalling radio bearer of said radio base station; and means, within the radio network controller, for forwarding the signalling radio bearer with the associated priority indicator to the radio base station; and the radio base station providing communication services to a radio network controller and providing communication services to a user equipment, the radio base station comprising:

means, at the radio base station, for receiving a request from the radio network controller to transmit the signalling radio bearer to the user equipment, and associating said signalling radio bearer with a priority indicator that has been determined with respect to a content of the signalling radio bearer;

means, at the radio base station, for estimating the available radio resources for downlink transmissions on a high-speed downlink shared channel to the user equipment;

means, at the radio base station, for creating the signalling radio bearer being associated with said priority indicator; and a scheduler, at the radio base station, for scheduling downlink radio resources for transmission of the signalling radio bearer; and the scheduler for assigning sufficient downlink radio resources that ensure correct delivery of said signalling radio bearer; and the radio network controller further comprising means for detecting a lack of downlink radio resources and then increasing a reliability of transmitting the signalling radio bearer to the user equipment by increasing an availability of radio resources which is done by utilizing at least one of following:

means for reconfiguring a channel of one or several radio links; and means for restricting a transport format of one or several radio links; and wherein the detecting means further comprises means for determining, prior to determining the priority indicator, a number of losses of signalling radio bearers and if said number exceeds a threshold value then increasing the availability of radio resources by utilizing at least one of the reconfiguring means and the restricting means and then repeating said determining a number of losses of signalling radio bearers after having increased the availability of radio resources.

24. A radio network controller in a telecommunication system providing a connection to a radio base station which provides communication services to a user equipment, comprising:

a processor; and a memory that stores processor-executable instructions where the processor interfaces with the memory and executes the processor-executable instructions to perform operations as follows:

determine a priority indicator with respect to a content of a signalling radio bearer to be sent on a High-Speed Downlink Shared Channel (HS-DSCH) from the radio base station to the user equipment;

associate said priority indicator to the signalling radio bearer;

transmit to the radio base station the priority indicator associated with said signalling radio bearer; and detect a lack of downlink radio resources and then increase a reliability of transmitting the signalling radio bearer to the user equipment by increasing an availability of radio resources which is done by performing at least one of following operations:

reconfigure a channel of one or several radio links; and
restrict a transport format of one or several radio links; and wherein the detect operation further comprises determining, prior to determining the priority indicator, a number of losses of signalling radio bearers and if said number exceeds a threshold value then increasing the availability of radio resources by performing at least one of the reconfiguring operation and the restricting operation and then repeating said operation of determining a number of losses of signalling radio bearers after having increased the availability of radio resources; and wherein the processor and the memory are components of the radio network controller.

25. The radio network controller according to claim 24, wherein the content relates to cell change information.

26. The radio network controller according to claim 24, wherein the radio base station has a previously established radio link with the user equipment.

* * * * *